United States Patent
Yalcinalp

(10) Patent No.: US 6,507,857 B1
(45) Date of Patent: Jan. 14, 2003

(54) EXTENDING THE CAPABILITIES OF AN XSL STYLE SHEET TO INCLUDE COMPONENTS FOR CONTENT TRANSFORMATION

(75) Inventor: L. Umit Yalcinalp, Belmont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/523,378

(22) Filed: Mar. 10, 2000

Related U.S. Application Data

(60) Provisional application No. 60/123,916, filed on Mar. 12, 1999.

(51) Int. Cl.$^7$ .............................................. G06F 17/21
(52) U.S. Cl. ................... 707/513; 707/501.1; 707/522; 707/523
(58) Field of Search ............................. 707/501.1, 513, 707/514, 530, 523, 522

(56) References Cited

U.S. PATENT DOCUMENTS

| | | | |
|---|---|---|---|
| 5,860,073 A | 1/1999 | Ferrel et al. ................. | 707/522 |
| 5,870,549 A | 2/1999 | Bobo, II ..................... | 709/206 |
| 6,012,098 A | 1/2000 | Bayeh et al. ................ | 709/246 |
| 6,023,714 A | 2/2000 | Hill et al. ................... | 707/513 |
| 6,031,989 A | 2/2000 | Cordell ....................... | 707/513 |
| 6,154,738 A | * 11/2000 | Call .............................. | 707/4 |
| 6,263,332 B1 | * 7/2001 | Nasr et al. ..................... | 707/5 |
| 6,317,783 B1 | * 11/2001 | Freishtat et al. ............ | 709/218 |

OTHER PUBLICATIONS

Andrew P. Black, Edward D. Lazowska, Jerre D. Noe and Jan Sanisio, "The Eden Project: A Final Report", Department of Computer Science, University of Washington, Technical Report 86–11–01, Nov. 1986, pp. 1–28.

Calton Pu, "Replication and Nested Transactions in the Eden Distributed System", Doctoral Disseration, University of Washington, Aug. 6, 1986, pp. 1–179 (1 page Vita).

Cara Holman and Guy Almes, "The Eden Shared Calendar System", Department of Computer Science, FR–35, University of Washington, Technical Report 85–05–02, Jun. 22, 1985, pp. 1–14.

Eric Jul, "Object Mobility in a Distributed Object–Oriented System", a Dissertation, University of Washington, 1989, pp. 1–154 (1 page Vita).

Eric Jul, Henry Levy, Norman Hutchinson, and Andrew Black, "Fine–Grained Mobility in the Emerald System", University of Washington, ACM Transactions on Computer Systems, vol. 6, No. 1, Feb. 1988, pp. 109–133.

Felix Samson Hsu, "Reimplementing Remote Procedure Calls", University of Washington, Thesis, Mar. 22, 1985, pp. 1–106.

(List continued on next page.)

*Primary Examiner*—Stephen S. Hong
(74) *Attorney, Agent, or Firm*—Finnegan, Henderson, Farabow, Garrett & Dunner, L.L.P.

(57) ABSTRACT

Systems and methods consistent with the present invention use a Namespace paradigm to define an external component reference to a style sheet. When the style sheet processor processes the tags in the style sheet, it recognizes the external component declaration. The style sheet will contain a name of the external component instance and a definition of the method to execute associated with the external component instance, and may contain arguments for the method associated with the external component instance which is executing. The XSLT processor then relinquishes control to the external component to execute the method defined in the style sheet. The results of the method's execution may be placed in the transform document generated by processing the style sheet. However, this is not required and other results may be generated, including those not related to the transform document.

24 Claims, 5 Drawing Sheets

OTHER PUBLICATIONS

Guy Almes, Andrew Black, Carl Bunje and Douglas Wiebe, "Edmas: A Locally Distributed Mail System", Department of Computer Science, University of Washington, Technical Report 83–87–01, Jul. 7, 1983, Abstract & pp. 1–17.

Guy T. Almes, "Integration and Distribution in the Eden System", Department of Computer Science, University of Washington, Technical Report 83–01–02, Jan. 19, 1983, pp. 1–18 & Abstract.

Guy T. Almes, "The Evolution of th Eden Invocation Mechanism", Department of Computer Science, University of Washington, Technical Report 83–01–03, Jan. 19, 1983, pp. 1–14 & Abstract.

Guy T. Almes, Andrew P. Black, Edward D. Lazawska, and Jerre D. Noe, "The Eden System: A Technical Review", Department of Computer Science, University of Washington, Technical Report 83–10–05, Oct. 1983, pp. 1–25.

Guy T. Almes, Michael J. Fischer, Hellmut Golde, Edward D. Lazawska, Jerre D. Noe, "Research in Integrated Distributed Computing", Department of Computer Science, University of Washington, Oct. 1979, pp. 1–42.

Krasner et al., "SmallTalk–80: Bits of History, Words of Advice", 1983 Xerox Corporation, pp. 1–344.

Norman C. Hutchinson, "Emerald: An Object–Based Language for Distributed Programming", a Dissertation, University of Washington, 1987, pp. 1–107.

Proceedings of the Eighth Symposium on Operating Systems Principles, Dec. 14–16, 1981, ACM, Special Interest Group on Operating Systems, Association for Computing Machinery, vol. 15, No. 5, Dec. 1981, ACM Order No. 534810.

"Eden Project Proposal", Department of Computer Science, University of Washington, Oct. 1980, Technical Report #80–10–01, cover and Foreword.

Adele Goldberg and David Robson, "Smalltalk–80—The Language and its Implementation", Xerox Palo Alto Research Center, 1983 (reprinted with corrections, Jul. 1985) pp. 1–720.

Andrew Black, Norman Hutchinson, Eric Jul and Henry Levy, "Distribution and Abstract Types in Emerald", University of Washington, Technical Report No. 85–08–05, Aug. 1985, pp. 1–10.

Andrew Black, Norman Hutchinson, Eric Jul, and Henry Levy, "Object Structure in the Emerald System", University of Washington, Technical Report 86–04–03, Apr. 1986, pp. 1–14.

Andrew Blaine Proudfoot, "Replects: data replication in the Eden System", Department of Computer Science, University of Washington, Technical Report No. TR–85–12–04, Dec. 1985, pp. 1–156.

Andrew P. Black and Henry M. Levy, "A Language for Distributed Programming", Department of Computer Science, University of Washington, Technical Report 86–02–03, Feb. 1986, p. 10.

Andrew P. Black, "Supporting Distributed Applications: Experience with Eden", Department of Computer Science, University of Washington, Technical Report 85–03–02, Mar. 1985, pp. 1–21.

Andrew P. Black, "The Eden Programming Language", Department of Computer Science, FR–35, University of Washington, Technical Report 85–09–01, Sep. 1985 (Revised, Dec. 1985), pp. 1–19.

Andrew P. Black, "The Eden Project: Overview and Experiences", Department of Computer Science, University of Washington, EUUG, Autumn '86 Conference Proceedings, Manchester, UK, Sep. 22–25, 1986, pp. 177–189.

PCT International Search Report dated May 25, 2000.

Exner, Nina, et al. "Examining XML: new concepts and possibilities in Web authoring," Computers in Libraries, Nov. 1, 1998, v18, n10, p. 50–53, 4 pages.

McGrath, Sean, Rendering XML documents using XSL (Extensible Style Language), Dr. Dobb's Journal, v23, n7, p. 82(6), Jul. 1998.

Senna, Jeff, "XML bridges the gap," InfoWorld, v20, n22, p. 88, Jun. 1, 1998.

Stanek, William Robert, XML 201. (Technology Information), PC Magazine, v17, n17, p. 217(1), Oct. 6, 1998.

Stevens, M., Xtending the Enterprise (extensible markup language (XML) (Technology Information), Intelligent Enterprise, 8(1), Nov. 1998.

Walsh, N., "The Extensible Style Language: XSL," WEB Techniques, v4, n1, p. 49–50, 52, 54–5, Jan. 1999.

Zeichick, Alan, "Lesson 124: XML and XSL," (Technology Tutorial) Network, p. 23(1), Nov. 1998.

* cited by examiner

EXTENDING THE CAPABILITIES OF AN XSL STYLE SHEET TO INCLUDE COMPONENTS FOR CONTENT TRANSFORMATION

RELATED APPLICATIONS

Provisional U.S. patent application Ser. No. 60/123,916 entitled "Enhanced XML Processing for Content Transformation" filed Mar. 12, 1999, is relied upon and is incorporated by reference in its entirety in this application.

BACKGROUND

1. Field of the Invention

The present invention relates to the use of style sheets in creating a document, and more particularly, to the use of external components in an XSL style sheet.

2. Description of the Related Art

Systems' and applications' use of documents has become so prolific that style sheets are now often used to help manage the documents' display. Style sheets provide greater flexibility and control over the display of a document's content. XSL style sheets also allow the content of documents to be transformed, making them as document transformers where the resulting documents may or may not be used for display. A user may request a document and the application associated with the document will use the information contained in the style sheet to display a new document incorporating the information contained within the style sheet and the requested document.

Typically, an XSL style sheet includes the use of tags. Tags are codes that identify an element in the document, such as heading or font, for the purpose of formatting the document. For example, the tag "<BOLD>" indicates that the text associated with this tag should appear in bold. Style sheets also, however, have become more advanced, to include a type of programming language. An example of this is an Extensible Style Language (XSL) style sheet. XSL is a declarative style sheet language specified in Extensible Markup Language (XML) which can also be used to transform XSL documents. The XSL is actually more analogous to a programming language than to a mechanism designed purely to analyze tags and display attributes.

With XML, developers may provide functionality by creating their own customized tags. For example, XML supports links that point to multiple documents, as opposed to HTML links, which can reference just one destination each.

XML documents may be served to different clients with varied interests and capabilities. For example, a PC running NETSCAPE may require a document formatted differently than a PDA would. XSL is the style language used by XML to allow different clients to receive different XML documents. XSL is a specification language for separating style from content when creating XML or HTML pages. XSL style sheets allow a single style to be applied to multiple documents.

However, there are limitations to the use of style sheets. An application utilizing a style sheet to display a document often requires that the information contained in the style sheet be application dependent. In other words, the application must be aware of all the tag definitions.

In addition, style sheets typically are not very robust and while they use a programming language, do not provide for external calls to components or libraries which may be used to aid in the modification of document information to be displayed.

Similarly, the use of XSL style sheets has been limited. Information contained within the XSL style sheet must be defined within the application and the XSL style sheet itself, and therefore the style sheet becomes application dependent. This sometimes is not desirable when using a style sheet across multiple applications, in which case a separate style sheet for each application would need to be developed. Furthermore, the XSL style sheet is completely self-contained in that no modules or functions can be called outside the style sheet itself. Therefore, what is needed in the art is the ability to create a style sheet that is application independent and to provide a means for creating application dependent functions within that style sheet.

SUMMARY OF THE INVENTION

Methods, systems and articles of manufacture consistent with the present invention overcome the shortcomings of existing style sheets by providing the ability to define components in a style sheet in order to execute methods outside the application. Using a Namespace paradigm, these components, declared within the style sheet, will be recognized by a style sheet processor.

In accordance with one aspect of the present invention, as embodied and broadly described herein, in a data processing system, a method of creating a transform document using a style sheet comprises the steps of receiving a request for an input document, retrieving the style sheet, having tags, associated with the input document, wherein one of the tags represents an external component, processing the tags, including one tag representing an external component, in the style sheet to generate a transform document, and processing a method associated with the external component. An additional step of placing the results of processing the method associated with the external component in the transform document may be performed. The method associated with the external component may generate application specific results. In addition, the style sheet may contain commands written in an XSL format. The step of processing the method associated with the external component may include loading the external component in an XSLT processor and initiating the execution of the method associated with the external component. In addition, the step of validating the style sheet and the input document may be performed. And finally, the step of locating an existing instance of the external component, wherein the processing of the one tag representing an external component includes using the existing instance, may be performed.

In accordance with another aspect of the present invention, as embodied and broadly described herein, in a data processing system, a method for executing an external component in a style sheet, comprising the steps of defining an external component to a style sheet processor, providing a definition of the external component in the style sheet, and processing the external component by the style sheet processor. The steps of loading the external component into the style sheet processor, calling the method associated with the external component defined in the style sheet, and passing an argument contained in the style sheet to the external component for use by the method may also be performed. In addition, the step of loading the external component including the step of locating an existing instance of the external component may also be performed. The external component may be defined to an XSLT processor and the style sheet using a Namespace. And, an application associated with an input document using the style sheet may not recognize the external component. Processing the external component may include executing a method associated with the external component which generates a result, and placing the result in a transform document.

In accordance with yet another aspect of the present invention, as embodied and broadly described herein, a system for processing external components in a style sheet comprises a style sheet containing a definition of an external component and a definition of a method associated with the external component, and a style sheet processor operative to receive a request for an input document, retrieve the style sheet, and call the method associated with the external component defined in the style sheet. The style sheet may contain an argument to pass to the method associated with the external component. In addition, a Namespace may be used in defining the external component to the style sheet and the style sheet processor. The style sheet processor may be an XSLT processor and the style sheet contains tags written in an XSL format. And finally, the style sheet processor may be further operative to generate a transform document and to insert a result of the call to the method associated with the external component.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION OF THE PREFERRED EMBODIMENT

Figure 1:
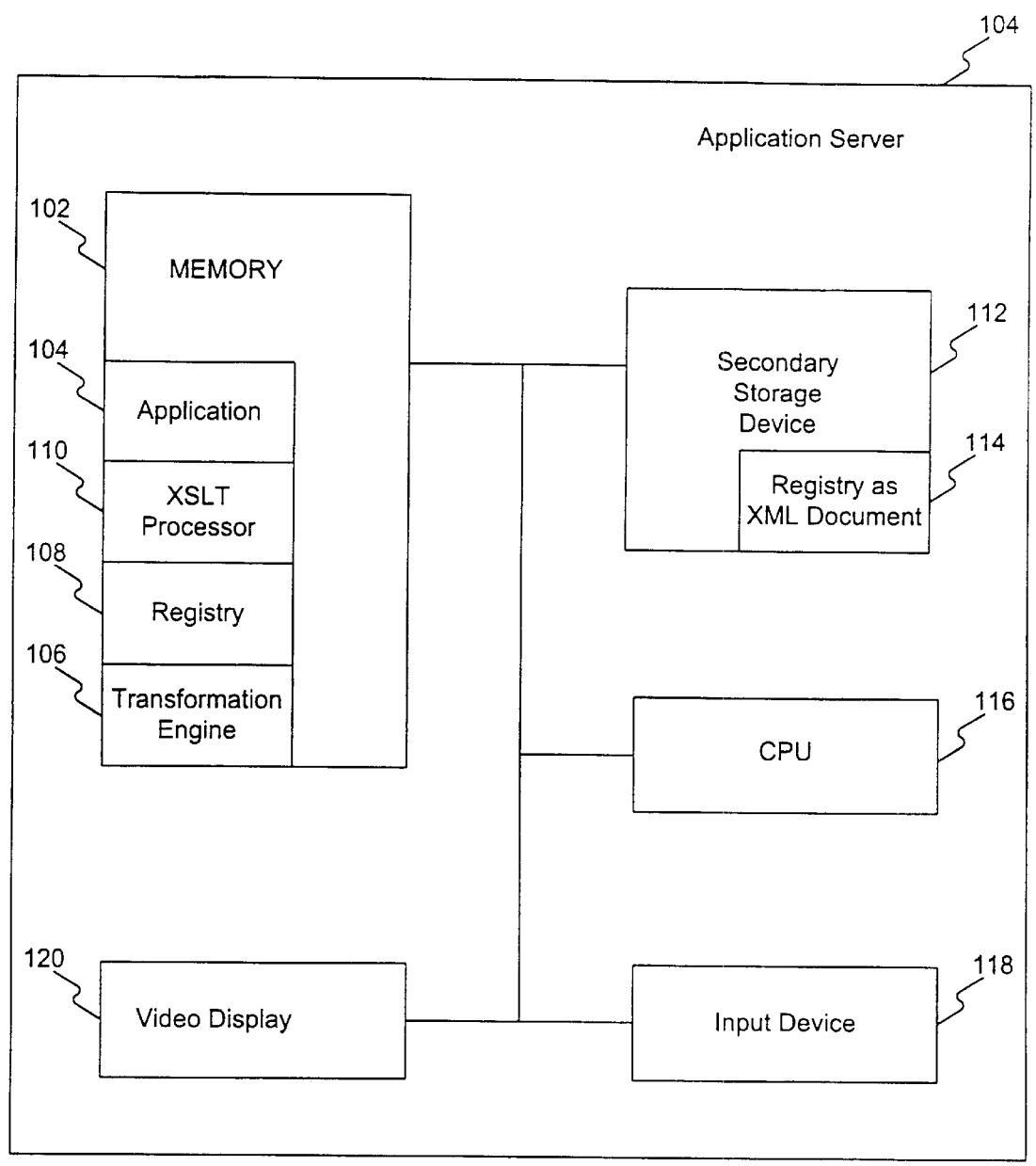
FIG. 1 depicts a data processing system suitable for practicing methods and systems in a manner consistent with exemplary embodiments of the present invention.

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Introduction

Systems and methods consistent with the present invention use a Namespace paradigm to define an external component to a style sheet. Namespaces are covered in more detail by the "Namespaces in XML" recommendation specification by the World Wide Web Consortium. When the style sheet processor processes the tags in the style sheet, it recognizes the external component declaration and a locator to load the component. The style sheet will also contain a definition of the method to execute associated with the external component and a name which designates a particular instance of a component, and may contain arguments for the method which is executing. The style sheet processor, or the XSLT processor in one embodiment, then relinquishes control to the named external component instance to execute the method defined in the style sheet. The results of the method's execution may be placed in the new document generated by processing the style sheet. However, this is not required, and this execution may provide any results including those not related to the document.

During processing, XSL external components may treat the document specific tags as its input declared by specific Namespaces that designate an input document. The tags that pertain to an external component which are also declared with respect to a particular Namespace will be recognized by the XSLT processor during the validation of a style sheet as declarations of component invocations. During the processing of a document with a style sheet, an XSLT processor will use the component specification along with arguments defined in the XSL style sheet to perform the external component method defined to the XSLT processor associated with the particular component.

The specific instances of a component may designated by a name. By doing so, different instances of the same component may be active within the same document and useful in performing different tasks. Processing the external component may include executing a method associated with the external component's instance which generates a result and placing the result in a document. The XSLT processor also ensures that a global processing context which is initialized during the validation step by the XSLT processor and can be shared by all the components and their instances referenced within a style sheet during processing of a document is made available to the component instances during processing. The components can utilize the context in their execution and hence change the content of the output document. The components also have access to the current document fragment that is processed by the style sheet and means of generating fragments of a transformed document. The generated result may depend on the context which the XSLT processor supplies to the component's instance. Multiple components or component instances can share the context during an execution.

System Architecture

FIG. 1 depicts a data processing system suitable for practicing methods and systems in a manner consistent with exemplary embodiments of the present invention. As shown in FIG. 1, application server 104 includes a memory 102, a secondary storage device 112, a CPU 116, an input device 118, and a video display 120. Memory 102 includes application 104, transformation engine 106, registry 108, and XSLT processor 110. Application 104 receives client requests and provides XML documents to those clients. Transformation engine 106 maintains mapping of all XSL translations, responds to queries from application 104, publishes new registries, and runs an informative servlet. A servlet is a Java applet that runs on a server. Transformation engine 106 may contain a web interface, Application Program Interface (API), or other input interface. An API is a set of routines, protocols, or tools for communicating with software applications. APIs provide efficient access to the registry without the need for additional software to interface with the file.

Memory 102 contains an XSLT processor 110 that applies the XSL transformation to XML document 106. Secondary storage device 112 contains a registry as XML Document 114. This registry 114 is an XML representation of registry 108. Registry 114 serves as a backup that may be easily loaded into memory 102.

Figure 2:
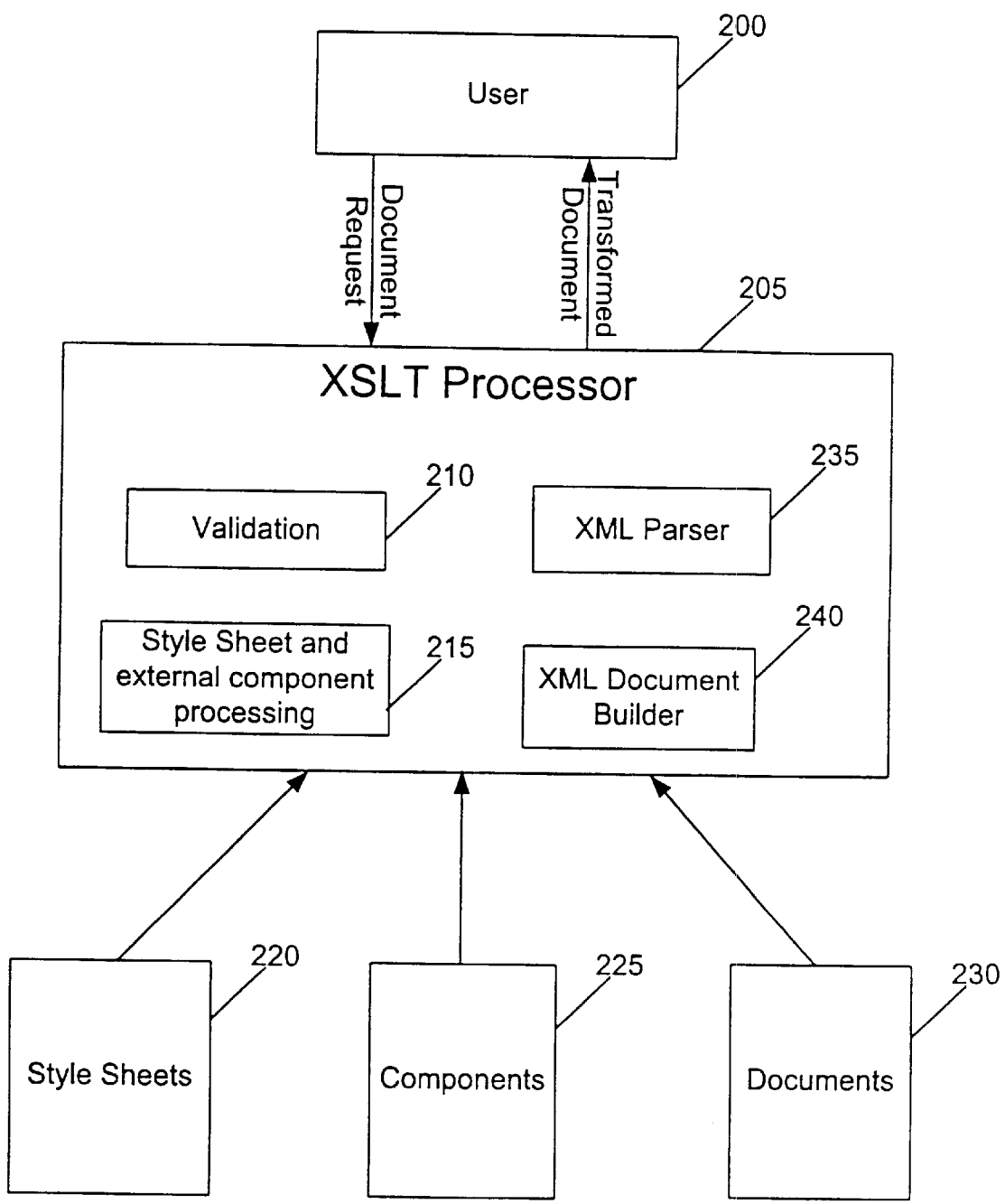
FIG. 2 depicts a more detailed view of an XSLT processor and components related to the XSLT processor suitable for practicing methods and systems in a manner consistent with an exemplary embodiment of the present invention.

FIG. 2 depicts a more detailed view of an XSLT processor and components related to the XSLT processor suitable for practicing methods and systems in a manner consistent with an exemplary embodiment of the present invention. The XSLT processor 205 interfaces with multiple modules in order to process an external component declared within a style sheet. The user 200 may request a document and may provide to the XSLT processor 205 a client type. For example, the user client type might be a PDA or a browser on a PC. The XSLT processor will process this request, and when complete, will send to the user a transform document.

The XSLT processor may perform many functions, several of which are depicted in FIG. 2. A validation module 210 will validate the input document request issued by the user and validate the style sheet that is associated with the input document request to ensure that the correct style sheet to generate a transform document is used and valid. The XSLT processor will also understand the external component declarations specified with Namespaces in the style sheets and load them as necessary. The style sheets and component processing module 215 are used to generate a transformed document for the user in response to the document request. This transformed document will incorporate the results of commands given within the style sheet, e.g., tags, and will also incorporate the results of any methods executed by an external component instance, if any. An XML Parser 235 may be used to parse the input documents and style sheets. An XML Document Builder 240 may be used to build a memory representation of the parsed documents or transformed documents.

To generate this display document, in one embodiment, the XSLT processor 205 accesses style sheets 220, components 225, and content, e.g., XML documents 230. These style sheets 220, components 225, documents 230, may be contained in memory within the data processing system described with respect to FIG. 1, in secondary storage or in other storage areas which the XSLT processor 205 can access. As stated, the user will generate a document request. The XSLT processor 205 will recognize, by examining the document request, an associated style sheet. The XSLT processor 205 then retrieves the appropriate style sheet associated with the document requested in order to process and generate a transform document to present to the user.

The components module 225 contains the external components that may be declared in the style sheet by way of a Namespace paradigm. When the style sheet names a reference to an external component, the XSLT processor may create an instance of the component if the named component instance has not been created, or use an already created component instance by looking it up with its name. The XSLT processor may pass any arguments also defined in the style sheet and initiate the specific method execution in the external component instance.

Documents 230 contain input documents, i.e., those documents that contain the content of the document requested by the user, which the XSLT processor will use in conjunction with the style sheet to generate a transform document.

Figure 3:
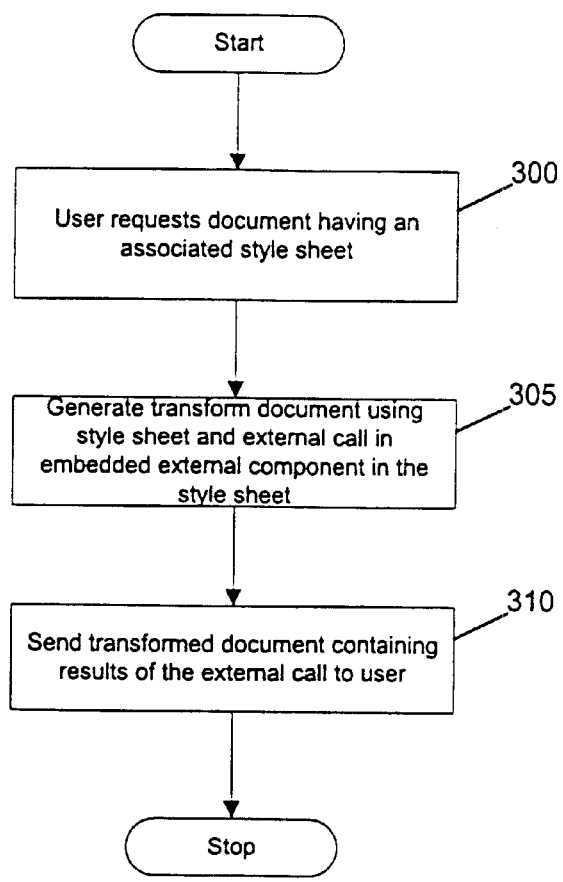
FIG. 3 is a flowchart depicting a high level process of generating a transform document using the results of an external call contained within a style sheet.

FIG. 3 is a flowchart depicting a high level process of generating a new document using the results of an external call contained within a style sheet. This process begins by the user requesting a document having an associated style sheet (step 300). In the present invention, the style sheet does not have to be application dependent. The style sheet may contain XSLT language commands as well as reference to an external component. This external component may be used to generate application specific information or other information desired by the developer of the style sheet. In addition, along with the user request, the client type of the user may be sent along with the document request. The client type will specify what type of client the user is, and will be an indication to the processor processing the user request how to format the transformed document specific to the client specification.

The method then proceeds to generate a transform document using the style sheet and an external call embedded in an external component in the style sheet (step 305). The external call is to a named component instance and may perform a function defined by the developer creating the external call. In other words, it is not required that the external call perform some function related to the transformed document or even a function related to the document processing. It may be preferable for the developer of the style sheet to insert into the external function parameters and information that may be application dependent. However, as stated above, the external call may also perform various other types of processing.

After processing the external call embedded in the external component, the XSLT processor continues to process the rest of the style sheet and the input document. Other methods of external components embedded within the style sheet might be activated as described above. When the style sheet is completely processed by the XSLT processor, the process sends a transform document containing the results of the external call to the user (step 310). The new document will be transformed or formatted using commands contained in a style sheet associated with the document requested by the user. For example, these commands may define display parameters and other aspects associated with the new document display on the client type for the user. In addition, the style sheet may contain the definition of the external call, as well as any arguments that may be passed through the external call.

Figure 4:
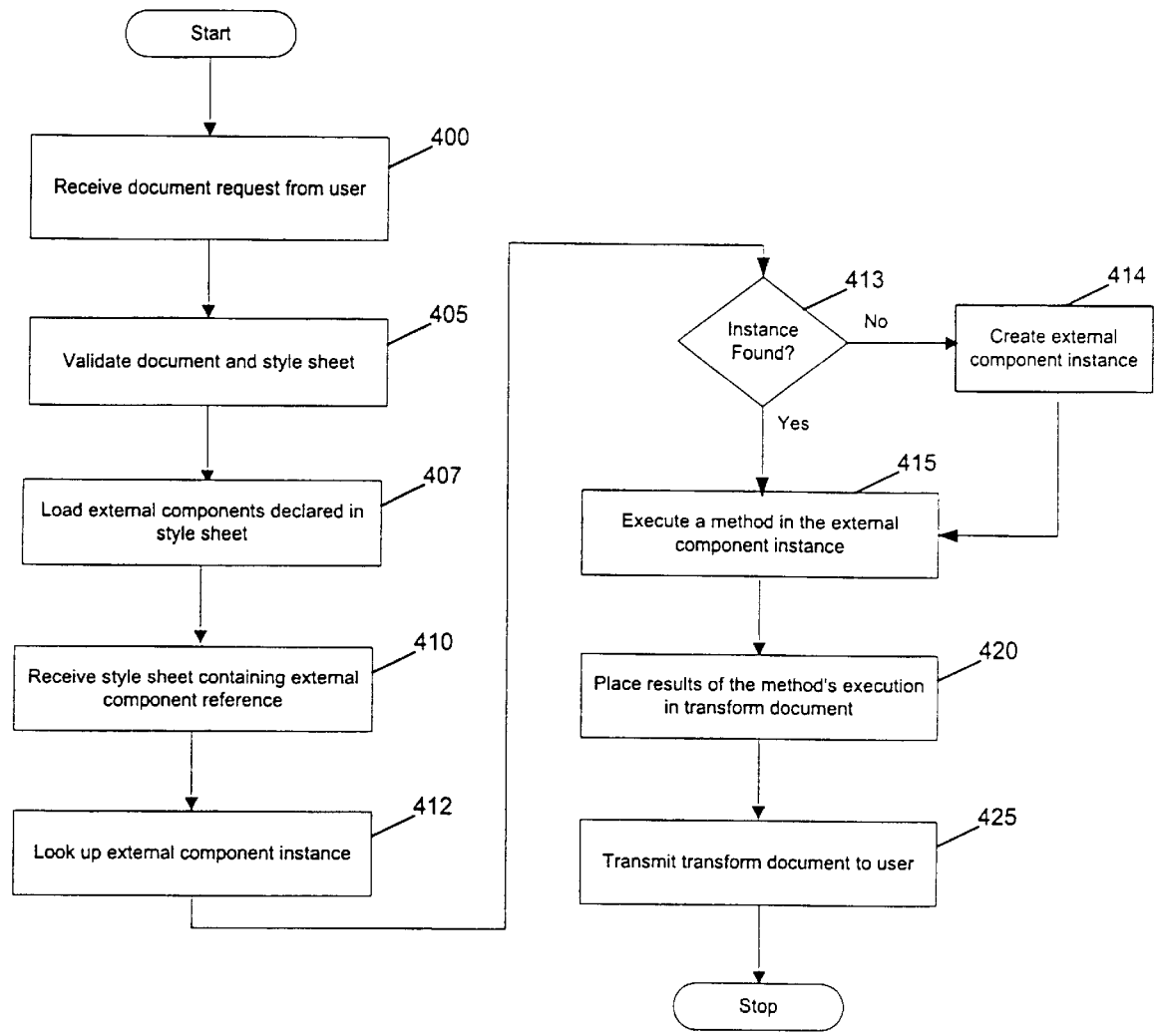
FIG. 4 is a flowchart depicting the process for generating a transform document containing the result of executing a method associated with an external component.

FIG. 4 is a flowchart depicting the process for generating a transform document containing the result of processing an external component in a style sheet. The process begins by receiving a document request from a user (step 400). The user may request this by using a PC or other type of data processing system by which he has access to the XSLT processor. The XSLT processor receives the document request and client type from the user and validates the document and the style sheet associated with the document (step 405). As part of the validation process, in one embodiment, the XSLT processor validates a document by using an XML parser and validates a style sheet by using an XML parser and using the XSL language. XSL style sheets are written using the XSL language which is described in XML.

The XSLT processor then receives the style sheet containing reference to an external component (step 410). The style sheet may be developed by a user when specifying how a document is to be transformed. The user in the present invention may also specify an external component to the style sheet. The user can also specify a named instance of a component which allows the user to activate different instances of the same external component to process different sections of a document. The naming mechanism that is used as a parameter in the style sheet in referring a component designates a specific instance of an external component. Note that this is different than the Namespaces. Namespaces describe extensions to recognize the component declaration elements in a style sheet. Name attributes within the scope of a component identification element in the XSLT style sheet designate a specific instance of a particular component.

The external component may contain a definition of a method which produces results desired by the user. This external component does not need to be application dependent, however, application dependent information may be placed within the external component. The component can also utilize a processing context passed by the XSLT processor.

The process then checks to see if an instance of the external component already exists, i.e., is active, in the XSLT processor (Step 412). If it is determined that an instance is not found in Step 413, then the "No" branch is followed and an external component instance is created (Step 414). If it is determined that the instance is found in Step 413, then the "Yes" branch is followed to Step 415. Consequently, the name of the external component may play an important role in this process. If the XSLT processor has encountered this named component instance before, it locates and reuses the same component instance. Otherwise, the processor creates and initializes a fresh new instance and stores its name and the component reference in memory.

The style sheet processor begins processing the tags contained within the style sheet to generate the transformed document for the user which may or may not be used for display. If the style sheet contains an external component, as in one embodiment of the invention, a method will be defined to the external component. The process proceeds by executing the method in the external component instance (Step 415). As part of executing this method, various parameters, i.e., arguments, may be associated with the component that the user has specified in the style sheet. These parameters and the document fragment which is currently being processed by the style sheet will be passed to the external component that is being activated. The XSLT processor, when processing the style sheet, relinquishes control to the instance of the component so that it performs the method defined in the style sheet. After that method has been completed, processing returns to the XSLT processor to continue processing the style sheet and hence the input document.

Once all the tags in the style sheet have been executed, as well as any other method(s) associated with external components contained in the style sheet, the XSLT processor then places in a transform document the results of the tag processing as well as the results of the executed method(s) (step 420). This transform document is now transformed or formatted as desired by the user. It may contain the display characteristics or the transformed document content and tags as intended by the user, as well as the results of any external component processing as defined in the style sheet. Following the placement of the results of the tag processing, including external components, this new document is transmitted to the user using the associated client type (step 425).

Figure 5:
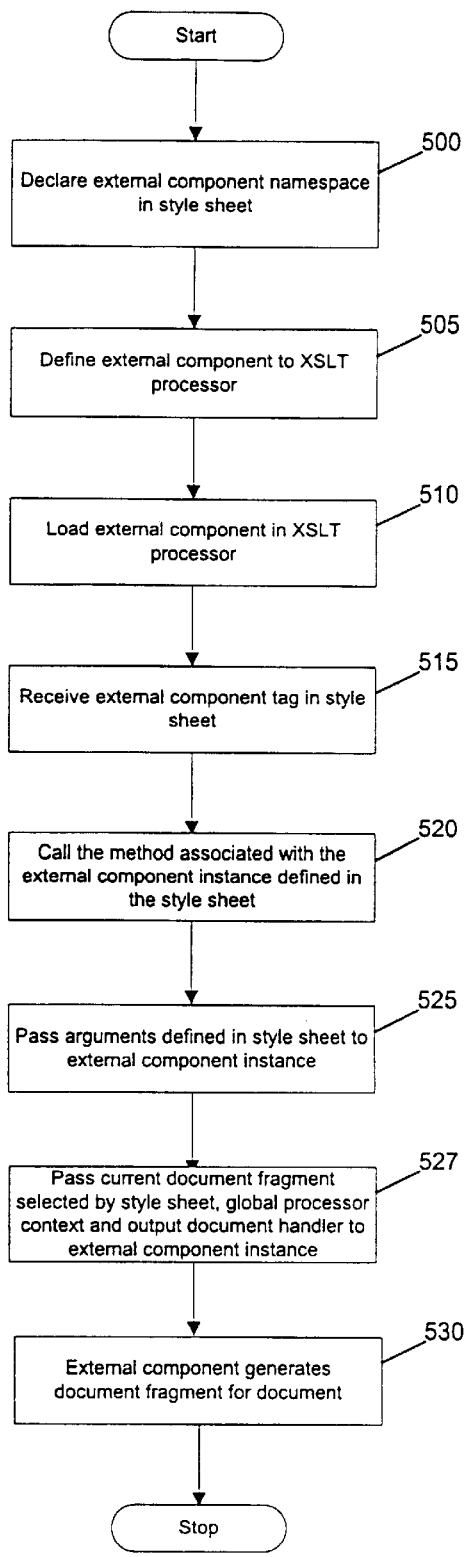
FIG. 5 is a method for creating and processing external components in a style sheet.

FIG. 5 is a method for creating and processing external components in a style sheet. This process begins by starting to validate a style sheet and declaring the component Namespace in the style sheet (step 500). This may be performed by defining it as a specific Namespace in the style sheet. The method of declaring Namespaces is well known to those skilled in the art. However, in this instance, the Namespace being declared is a Namespace defining external component activation in a style sheet.

Next, during the validation of the style sheet and processing of the XSLT tags, an external component identified by the specific Namespace declaration is identified and is defined to the XSLT processor (step 505). The use of Namespaces is well known to those skilled in the art. The Namespace paradigm may be used by an application such that when a specific module resides in the Namespace, the application will be aware of it and will know the location for their retrieval. In the present invention, a component Namespace is defined to an XSLT library so that during the execution of the style sheet, the XSLT processor is aware that an external component is being defined, and it can preload and resolve components which are declared.

Following definition of an external component Namespace to the XSLT processor and after validation of the style sheet is finished, the XSLT processor starts processing an input document with the validated style sheet and the loaded components. It processes the XSL language tags based on the language semantics and transforms the document in the process. When a component declaration needs to be processed in the style sheet during the style sheet processing with the control flow of the XSL language, the XSLT processor looks up the named instance of a component which is specified by the component tag. The component tag also specifies a loading instruction which is handled during the verification step. If the named component instance does not exist, the processor creates a new instance and associates the name specified in the component element with this instance and uses it (Step 510), where it is processed. If the instance already exists, however, the XSLT processor reactivates the named instance. Within the external component tag, in one embodiment, is a method definition associated with the external component instance to be processed.

During the processing of the style sheet, an external component tag is received from the style sheet (Step 515). This is an indication to the style sheet processor, the XSLT processor, that the following text associated with the component tag is for an external component associated with the Namespace declared within that style sheet. This external component tag, along with its Namespace declaration, provides an indication to the style sheet processor that there is an external component whose activation characteristics and its name will be specified, and not to anticipate having a definition for that tag within the application. When the special component tag is encountered, its contents will signal to the XSLT processor to relinquish control so that a method defined to the external component's named instance may be performed.

Next, the method associated with the component is called (step 522). Any values defined in the style sheet for the method received by the XSLT processor are then passed to the specific named method (step 525) as the arguments of the method in the component. The specific method will use the values passed from the XSLT processor as its arguments. This step can use the methods specified in the named external component.

A global context which the XSLT processor passes to the components to utilize and the current document fragment being processed by the style sheet and a transformed document fragment generator are also supplied to the component (Step 527). The methods in the external component instance take all the argument values specified in the method invocation. Three pieces of information need to be available for the external component instance: 1) the document fragment that is currently being processed as selected by the style sheet; 2) the global context that is provided by the XSLT processor; and 3) a means for creating document fragments in the transformed document that is provided to the component instance. The component instance may use or not use the value of the input document fragment or the context during its processing, but should depend on the availability of these items provided by the processor during runtime. This can be handled by different implementation techniques, either by requiring those three additional items to be included in the method signatures by allowing the XSLT processor to pass them to the component instance, or by requiring the component to use a specific API as well as its own API which is specialized with three different methods that pertain to obtaining these three items.

The invention also suggests a specific API which allows the component to obtain the document fragment, means of generating the resulting document fragment, and a global processing context which can be shared among components and their instances. Components which can be activated with this paradigm may utilize an API to be aware of the document processing and the context. For example, a getInputNode API may be used to get an input document fragment, a getDocumentFactory API may be use to create output document fragment and a getContext API may be used global context processing. At runtime, the components find the required information using the APIs, if necessary. By using the global context, the components can pass information to other components which then may be used in document transformations generated by the components. Components also retain their own state when they are reactivated to allow them to provide intelligence in document transformation.

The XSLT processor is not aware of the functions being performed by processing the external component nor is it in control of these functions. As stated above, processing the external component may include processing associated with the document transformation or display, it may perform other processing associated with the document, or it may even perform processing not associated with the document that the user has defined in the style sheet.

The external component instance, in one embodiment, may then generate a document fragment and place this document fragment into the transform document (step 530). This, of course, presumes that the external component performs a method that, when executed, generates results for the transform document. If no results are generated, the transformed document is not affected by the method execution in the external component instance. When the component instance's method returns execution to the XSLT processor, it resumes processing the document as specified in the style sheet. The XSLT processor during processing the style sheet may require to reuse the named component instance or activate other components instances as specified by the style sheet.

The XSLT processor may also perform error handling. The XSLT processor may record the method invocations if the method signatures in the named component does not match or other internal processing errors might occur. If errors are generated, the component will abort its execution and return a list of exceptions to the XSLT processor. Depending on the severity of the errors, the XSLT processor may log this as an error and continue processing to generate a transformed document, or the errors severity may abort the XSLT processor. Severe errors include, but are not limited to, unloadable components, inability to activate component instances and methods, or components indicating severe errors.

When the XSLT processor completes the processing of the style sheet, the new document containing the results of the style sheet along with the results of all external component instances is placed in the new document and sent to the user. It will be recognized by those skilled in the art that while the foregoing description included a discussion of one external component being executed in the style sheet, multiple external components may be executed and defined in a style sheet as defined by the user.

An Example of an External Component in a Style Sheet

Below is an example of a style sheet written in XSL:

```
<?xml version="1.0"?>
<!-XSL Style sheet, DTD omitted->
<xsl:stylesheet
    xmlns:xsl="http://www.w3.org/TR/WD-xsl"
    xmlns:xslcomponent=http://www.javasoft.com/lhs
    >
<xsl:template match="paragraph">
    <xslcomponent:component
        name="summary1"
        class=
            "com.sun.lhs.impl.samplecompo-
            nents.SummaryBuilder"
        >
        <xslcomponent:args>
        <xslcomponent:methodname="genSummary"/>
        <xslcomponent:argname="buffersize" value="100"/>
        >
        </xslcomponent:args>
    <xslcomponent:component>
    <xsl:apply-templates/>
</xsl:template>
</xsl:stylesheet>
```

The above example includes a Namespace declaration, xmlns:xlscomponent=http://www.javasoft.com/lhs, a component tag signifying that an external component will be used, xslcomponent:component a definition of a instance name which designates the specific instance of the component that will execute, name ="summary 1"

a class tag which describes the specific component to be loaded, in one embodiment, i.e., the class tag describes the full class name for components written in the Java language and arguments to pass to the external component to execute the method. In the example below, the method to be executed is named "genSummary" and it has one argument, the value 100),

```
<xslcomponent:args>
    <xslcomponent:methodname="genSummary"/>
    <xslcomponent:argname="buffersize" value="100"/>
    >
</xslcomponent:args>.
```

CONCLUSION

Systems and methods consistent with the present invention use a Namespace paradigm to define an external component reference to a style sheet. When the style sheet processor processes the tags in the style sheet, it recognizes the external component declaration. The style sheet will contain a name of the external component instance and a definition of the method to execute associated with the external component instance, and may contain arguments for the method which is executing. The XSLT processor then relinquishes control to the external component to execute the method defined in the style sheet. The results of the method's execution may be placed in the transform document generated by processing the style sheet. However, this is not required and other results may be generated, including those not related to the transform document.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the description refers to an external component instance, which will be recognized by those skilled in the art as an instantiation of an object in a system using object oriented language processing. However, other systems using other language processing mechanisms may be used. As yet another example, the described implementation includes software, but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. In a data processing system, a method of creating a transform document, comprising the steps of:
   receiving a request for an input document;
   retrieving the style sheet, having tags, associated with the input document, wherein one of the tags represents an external component;
   processing the tags, including one tag representing an external component, in the style sheet to generate a transform document;
   identifying a location of the external component based on the tag representing the external component;
   loading the external component into the style sheet from the identified location; and
   processing a method associated with the external component.

2. The method of claim 1 further comprising the step of placing the results of processing the method associated with the external component in the transform document.

3. The method of claim 1, wherein the method associated with the external component generates application specific results.

4. The method of claim 1, wherein the style sheet contains commands written in an XSL format.

5. The method of claim 1 further comprising the step of validating the style sheet and the input document.

6. A method for executing an external component in a style sheet, comprising the steps of:
   defining an external component to a style sheet processor;
   providing a definition of the external component in the style sheet;
   identifying a location of the external component based on the definition;
   loading the external component into the style sheet from the identified location; and
   processing the external component by the style sheet processor.

7. The method of claim 6, wherein the step of processing the external component includes executing a method associated with the external component which generates a result and placing the result in a transform document.

8. The method of claim 6 further comprising the step of providing a global context, a current input document fragment as processed by the style sheet and a mechanism to generate a transformed document fragment to the external component.

9. A system for processing external components in a style sheet, comprising:
   a style sheet containing a definition of an external component, a location of the external component, and a definition of a method associated with the external component; and
   a style sheet processor operative to receive a request for an input document, retrieve the style sheet, identify the location of the external component, load the external component into the style sheet, and call the method associated with the external component defined in the style sheet.

10. The system of claim 9, wherein the style sheet contains an argument to pass to the method associated with the external component.

11. The system of claim 9, wherein the style sheet processor is an XSLT processor and the style sheet contains tags written in an XSL format.

12. A computer readable medium containing computer-executable instructions for creating a display document using a style sheet to perform a method comprising the steps of:
   receiving a request for an input document;
   retrieving the style sheet, having tags, associated with the input document, wherein one of the tags represents an external component;
   processing the tags, including one tag representing an external component, in the style sheet to generate a transform document;
   identifying a location of the external component based on the tag representing the external component;
   loading the external component into the style sheet from the identified location; and
   processing a method associated with the external component.

13. In a data processing system, a method of creating a transform document using a style sheet, wherein the style sheet contains commands written in an XSL format, comprising the steps of:
   receiving a request for an input document;
   retrieving the style sheet, having tags, associated with the input document, wherein one of the tags represents an external component;
   processing the tags, including one tag representing an external component, in the style sheet to generate a transform document; and
   processing a method associated with the external component, wherein the method includes loading the external component in an XSLT processor and initiating the execution of the method associated with the external component.

14. In a data processing system, a method of creating a transform document using a style sheet, comprising the steps of:

receiving a request for an input document;

retrieving the style sheet, having tags, associated with the input document, wherein one of the tags represents an external component;

processing the tags, including one tag representing an external component, in the style sheet to generate a transform document;

processing a method associated with the external component;

locating an existing instance of the external component, wherein the processing of the one tag representing an external component includes using the existing instance.

15. A method for executing an external component in a style sheet, comprising the steps of:

defining an external component to a style sheet processor;

providing a definition of the external component in the style sheet;

processing the external component by the style sheet processor;

loading the external component into the style sheet processor;

calling the method associated with the external component defined in the style sheet; and passing an argument contained in the style sheet to the external component for use by the method.

16. The method of claim 15, wherein the step of loading the external component includes the step of locating an existing instance of the external component.

17. The method of claim 16 further comprising the step of processing different methods within the existing instance of the external component.

18. The method of claim 15 further comprising the steps of:

naming a first and a second instance of the external component; and processing the first and the second instance of the external component.

19. A method for executing an external component in a style sheet, comprising the steps of:

defining an external component to a style sheet processor, wherein the external component is defined to an XSLT processor and the style sheet using a Namespace;

providing a definition of the external component in the style sheet; and processing the external component by the style sheet processor.

20. A method for executing an external component in a style sheet, comprising the steps of:

defining an external component to a style sheet processor;

providing a definition of the external component in the style sheet;

processing the external component by the style sheet processor;

retaining state information from the processing of the external component; and reusing the state information during the processing of a second activation of the external component, wherein a result generated by the processing of an external component depends on the state information.

21. A system for processing external components in a style sheet, comprising:

a style sheet containing a definition of an external component and a definition of a method associated with the external component, wherein a Namespace is used in defining the external component to the style sheet and the style sheet processor; and a style sheet processor operative to receive a request for an input document, retrieve the style sheet, and call the method associated with the external component defined in the style sheet.

22. A system for processing external components in a style sheet, comprising:

a style sheet containing a definition of an external component and a definition of a method associated with the external component, wherein the style sheet processor is operative to generate a transform document and to insert a result of a call to the method associated with the external component; and a style sheet processor operative to receive a request for an input document, retrieve the style sheet, and call the method associated with the external component defined in the style sheet.

23. A computer readable medium containing computer-executable instructions for creating a display document using a style sheet to perform a method comprising the steps of:

receiving a request for an input document;

retrieving the style sheet, having tags, associated with the input document, wherein one of the tags represents an external component;

processing the tags, including one tag representing an external component, in the style sheet to generate a transform document;

processing a method associated with the external component; and locating an existing instance of the external component, wherein the processing of the one tag representing an external component includes using the existing instance.

24. A computer readable medium containing computer-executable instructions for creating a display document using a style sheet to perform a method comprising the steps of:

receiving a request for an input document;

retrieving the style sheet, having tags, associated with the input document, wherein one of the tags represents an external component;

processing the tags, including one tag representing an external component, in the style sheet to generate a transform document; and processing a method associated with the external component, wherein the method includes loading the external component in an XSLT processor and initiating the execution of the method associated with the external component.

* * * * *